United States Patent
McLoughlin et al.

(10) Patent No.: US 8,209,069 B1
(45) Date of Patent: Jun. 26, 2012

(54) AIRCRAFT SENSOR ANTICIPATOR SYSTEM

(75) Inventors: Frank A. McLoughlin, Leawood, KS (US); Xi Li, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 802 days.

(21) Appl. No.: 12/429,362

(22) Filed: Apr. 24, 2009

Related U.S. Application Data

(60) Provisional application No. 61/082,263, filed on Jul. 21, 2008.

(51) Int. Cl.
*G05D 1/00* (2006.01)
(52) U.S. Cl. .......................... 701/11; 701/14; 244/158.1
(58) Field of Classification Search ............... 701/8, 11, 701/13, 14; 244/75.1, 158.1
See application file for complete search history.

(56) References Cited

U.S. PATENT DOCUMENTS

| | | | |
|---|---|---|---|
| 3,627,236 A | 12/1971 | Hess | 244/77 |
| 3,686,626 A | 8/1972 | Bateman et al. | 340/27 |
| 3,744,309 A | 7/1973 | Astengo | 73/178 |
| 4,247,843 A * | 1/1981 | Miller et al. | 340/973 |
| 4,419,079 A * | 12/1983 | Georges et al. | 434/43 |
| 4,466,526 A | 8/1984 | Howlett et al. | 192/0.096 |
| 5,406,489 A * | 4/1995 | Timothy et al. | 701/4 |
| 5,689,251 A | 11/1997 | Houck et al. | 340/978 |

* cited by examiner

*Primary Examiner* — Gertrude Arthur Jeanglaude
(74) *Attorney, Agent, or Firm* — Samuel M. Korte

(57) ABSTRACT

An apparatus and method for estimating future pitch and roll angles of an aircraft to compensate for a time delay caused by a flight instrumentation system calculating the aircraft's pitch and roll. The apparatus may output signals to an aircraft autopilot system. The apparatus may comprise various inputs and outputs, at least one compensation module, and at least one addition module. The compensation module may multiply a gain value by the pitch rate of the aircraft and by the roll rate of the aircraft to determine a pitch compensation amount and a roll compensation amount. Then the pitch compensation amount may be added to the pitch of the aircraft, and the roll compensation amount may be added to the roll of the aircraft to solve for a compensated pitch and a compensated roll to send to the autopilot system.

25 Claims, 4 Drawing Sheets

AIRCRAFT SENSOR ANTICIPATOR SYSTEM

RELATED APPLICATION

This Application, under the provisions of 35 U.S.C. §119 (e), claims the benefit of priority to U.S. Provisional Application Ser. No. 61/082,263, filed Jul. 21, 2008, entitled "AIRCRAFT SENSOR ANTICIPATOR APPARATUS" the disclosure of which is incorporated herein by reference in its entirety.

BACKGROUND OF THE INVENTION

1. Field of the Invention

Embodiments of the present invention relate to aircraft control systems and methods. More particularly, embodiments of the present invention relate to a method and apparatus for estimating future pitch and roll angles of an aircraft.

2. Description of the Related Art

The attitude (or angular orientation) of a vehicle encompasses both its pitch angle and roll angle (or bank angle). For an aircraft, the pitch angle generally refers to the nose-up/nose-down angle, and the roll angle generally refers to the angle of the wings (e.g. left wing up/right wing down or left wing down/right wing up; similar concepts for helicopters). Aircraft autopilot systems use attitude information to control an airplane's angular orientation, altitude, airspeed, vertical speed, and direction of flight.

Aircraft avionics systems receive information from a variety of flight instrumentation systems, including digital attitude and heading reference systems (AHRS) and digital air data computers (ADC). For some applications, particularly for retrofit applications into already-fielded airplanes, the AHRS and/or ADC may be interfaced with an autopilot system having an existing certification basis that presumes an interface with a different type of attitude sensor, such as an older analog attitude sensor or another model of a digital AHRS. This can be problematic when the AHRS and/or ADC being interfaced with the autopilot system have different dynamics, including latency or time lag properties, than the original analog attitude sensor or the other model of the digital AHRS.

For example, many AHRSs have greater time lag or time delay than some analog vertical gyros that are being replaced. In one application, the AHRS has an effective overall time delay of 40 msec to 50 msec over a typical frequency range between 0 Hz and 2 Hz. The time delay from the AHRS may result in undesirable autopilot performance if the associated vertical gyro is replaced by the AHRS. Since the AHRS constitutes part of the autopilot system's control loop, the performance of the autopilot system may depend upon the effective time delay introduced in the pitch and roll values by the AHRS.

One option to overcome the dynamics between what the autopilot system has been designed for and what the AHRS outputs is to alter the autopilot system. However, altering the autopilot system adds to the cost and labor required to complete the retrofit.

SUMMARY

Embodiments of the present invention relate to retrofitting or updating aircraft pitch and roll sensors. More particularly, embodiments of the invention provide an apparatus and method for predicting pitch and roll of an aircraft to compensate for a time delay introduced by a flight instrumentation system that determines the actual aircraft pitch and roll. For example, the flight instrumentation system may be a digital attitude and heading reference system (AHRS) or a digital air data computer (ADC), and may replace an original flight instrumentation system, such as an analog vertical gyro. An embodiment of the apparatus of the present invention may receive a pitch and roll from the flight instrumentation system then generate a compensated pitch and a compensated roll to send to the autopilot system. The compensated pitch and compensated roll may represent estimations or predictions of the aircraft pitch and roll at a given point in time based on an amount of delay for which to compensate and based on measured pitch, pitch rates, roll, and roll rates of the aircraft.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
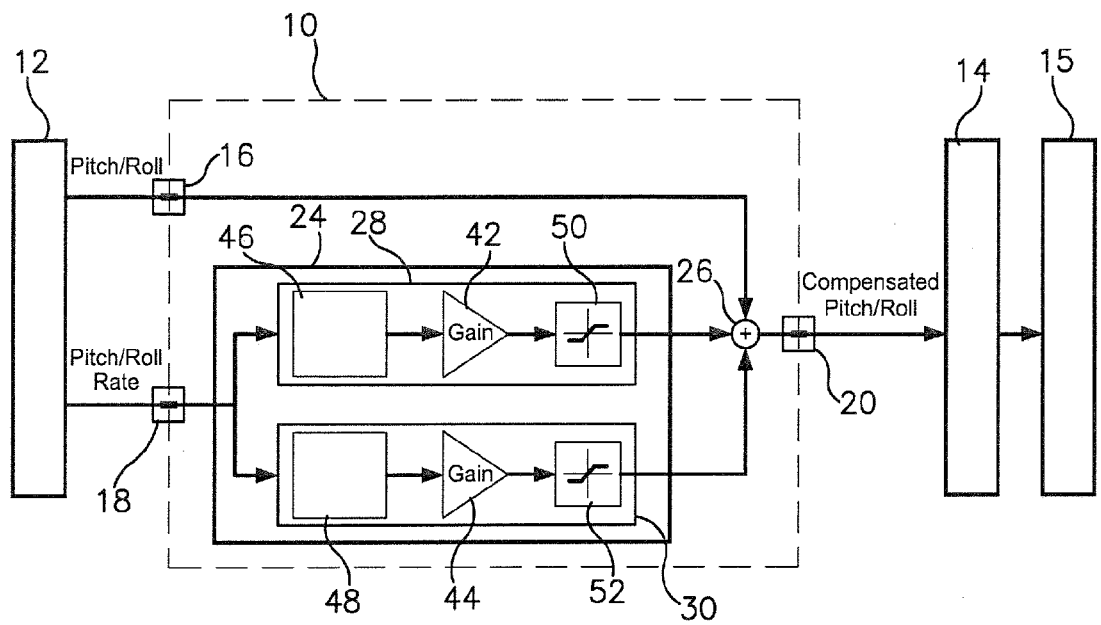
FIG. 1 is a schematic view of an apparatus constructed in accordance with an embodiment of the present invention for predicting pitch and/or roll of an aircraft.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of various embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

FIG. 1 illustrates an exemplary embodiment of an apparatus 10 for anticipating or estimating future pitch and/or roll angles of an aircraft to compensate for a time delay of a signal processed or calculated by a flight instrumentation system 12.

The apparatus 10 may receive signals from the flight instrumentation system 12 and may output signals to an aircraft autopilot system 14 or other avionics system, such as the Garmin® G1000®, G600™, or the like. The autopilot system 14 may be configured for receiving signals from an original flight instrumentation system (not shown) having a different amount of signal processing time than the flight instrumentation system 12. The apparatus 10 may comprise various inputs 16, 18 and outputs 20, at least one compensation module 24, and at least one addition module 26. The apparatus 10 may calculate any of a pitch compensation amount, a roll compensation amount, a compensated pitch, a compensated roll, combinations thereof, and the like, as described in more detail below.

The flight instrumentation system 12 may be a digital attitude and heading reference system (AHRS) such as the Garmin® GRS 77, a digital air data computer (ADC) such as the Garmin® GDC 74A/B, or any aircraft system that can replace the original flight instrumentation system. The original flight instrumentation system may be an analog attitude sensor, such as an analog vertical gyro, or any other AHRS that provides less processing time delay, on average, than the flight instrumentation system 12.

The AHRS may comprise 3-axis sensors that provide heading, attitude and yaw information for the aircraft. The AHRS may replace traditional mechanical gyroscopic flight instruments to provide improved reliability and accuracy. The AHRS may consist of solid-state micro-electromechanical systems (MEMS) gyroscopes, accelerometers, and magnetic sensors in all three axes. The AHRS may use GPS receivers to improve long-term stability. Additionally, the AHRS may use a Kalman or other estimation filtering to compute attitude and heading solutions from multiple sources. The AHRS may differ from traditional inertial navigation systems by using magnetometer and/or GPS data to aid the use of raw gyroscopic data. The AHRS may also be combined with air data computers to form an "air data, attitude and heading reference system" (ADAHRS), which may provide additional information such as airspeed, altitude and outside air temperature.

Figure 2:
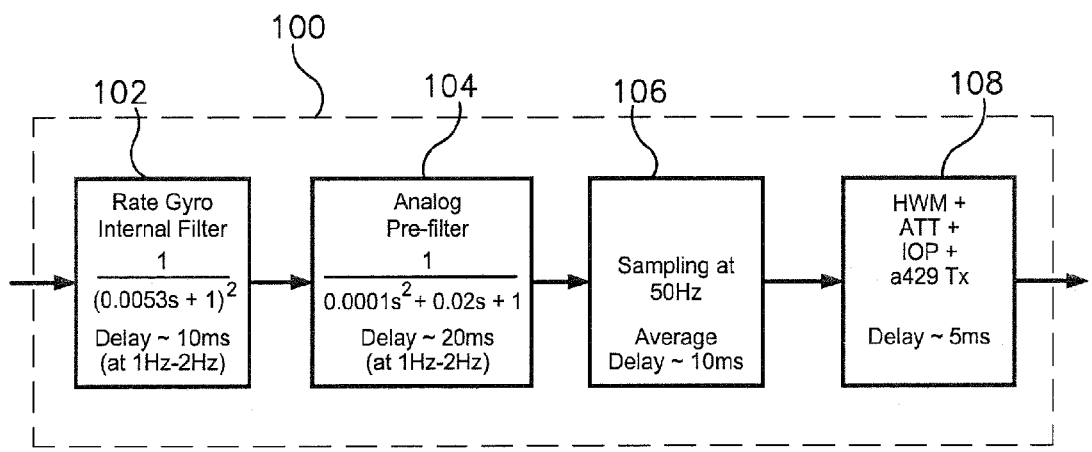
FIG. 2 is a flow diagram depicting the processing delays experienced by a signal in an exemplary digital AHRS before the signal is received by the apparatus of FIG. 1.

The delay 100 of an exemplary embodiment of the flight instrumentation system 12 as a digital AHRS, is illustrated in FIG. 2. In this embodiment, the time delay 100 may be caused by angular rate gyro sensor response bandwidth (block 102), analog pre-filter (block 104), data sampling at 50 Hz (block 106), and computation and output delays (block 108). For signal frequencies between 1 Hz and 2 Hz, for example, the rate gyro internal filters may have a time delay of about 10 msec, while the analog pre-filter may have a time delay of 20 msec. A data sampling time delay may be anywhere from 0 msec to 20 msec, with an average of 10 msec, while a time delay caused by computation and output processing may be bounded by 5 msec. Therefore, the average maximum time delay for output of pitch and roll from the AHRS illustrated in FIG. 2 may be about 45 msec for a signal with frequency content from 0 Hz to approximately 2 Hz, for example. As should be appreciated, the frequencies and times listed above are merely example times corresponding to an exemplary AHRS. Embodiments of the present invention including different AHRS than that represented in FIG. 2 may have different timing and frequency characteristics. For example, the data sampling illustrated in block 106 may occur at frequencies other than 50 Hz, such as 25 Hz, 100 Hz, 200 Hz, 400 Hz, etc.

In general, from a linear control system analysis perspective, the effective time delay results in a phase shift in an open-loop frequency response. Depending upon the magnitude of the time delay, and hence of the phase shift, there may be little practical effect on the open-loop behavior. However, the time delay may cause closed-loop instability or a less dampened step-response with limited tolerance to any additional effective time delays. A representative estimate of the amount of phase shift at the closed-loop control bandwidth ($f_{cl}$ in HZ) is given by:

$$\text{Phase shift at closed loop control bandwidth (deg)}= \text{TimeDelay(sec)}*f_{cl}(\text{Hz})*360$$

For closed-loop control purposes, it is desirable that the AHRS outputs have minimal time delay to either allow an increased closed-loop control bandwidth for a given desired phase margin, or an increased phase margin for a given closed-loop control bandwidth. Anti-aliasing filtering, periodic digital sampling of raw sensor data, computation duration, data input/output (I/O), and other delays inside of the AHRS may contribute to the overall effective time delay associated with AHRS outputs, as illustrated in FIG. 2 and described above.

The autopilot system 14 may be comprised of various software and hardware components and may be any autopilot system that uses present or real-time readings of the pitch and roll angles of the aircraft to determine how to actuate various control components of the aircraft. As mentioned above, the autopilot system 14 may be configured for receiving signals from the original flight instrumentation system. For example, various aircraft suitable for retrofit have existing autopilot systems driven by a vertical gyro. The time delay of the signal output by the flight instrumentation system 12 as compared with the original flight instrumentation system (such as a vertical gyro) may cause closed-loop instability for the autopilot system 14. Therefore, the apparatus 10 may be used to compensate for the time delay introduced by the flight instrumentation system 12, as described below.

The autopilot system 14 may be integrated with and/or connected to various flight control components 15, such as a manual flight control system or a fly-by-wire flight control system having a plurality of control surfaces, engine controls, and/or system controls for actuating various aircraft components, such as a rudder, aileron, or wing flaps.

The functions and methods carried out by the apparatus 10, as described herein, may be accomplished with hardware, software, firmware, or a combination thereof. The inputs 16,18 of the apparatus 10 may comprise a first input 16 and a second input 18. The first input 16 may comprise a pitch input and/or a roll input. The second input 18 may comprise a pitch rate input and/or a roll rate input. Thus, in some embodiments, the apparatus 10 may compensate for pitch, roll, pitch and roll, or even other parameters such as heading, yaw, combinations thereof, and/or the like. Each of the inputs 16,18 may comprise any sort of wires, communication jacks, receivers, transmitters, or other components for sending and/or receiving data or communication signals, such as electrical signals. Specifically, the inputs 16,18 may receive data or communication signals from the flight instrumentation system 12 or any other apparatus or system as required for a given application, and may send those data or communication signals to the compensation module 24 and/or the at least one addition module 26. For example, the signals provided to the inputs 16,18 may comprise any of a signal representing the pitch, a signal representing the roll, a signal representing the pitch rate, a signal representing the roll rate, a signal representing a combination thereof, and the like.

The outputs 20 of the apparatus 10 may be coupled with a digital to analog converter to provide digital and/or analog outputs to the autopilot system 14. The outputs 20 may comprise a compensated pitch output, a compensated roll output, or any other compensated output as described herein. Each of the outputs 20 may comprise any sort of wire, communication jack, receiver, transmitter, or other component for sending and/or receiving data or communication signals, such as electrical signals. Specifically, the outputs 20 may receive data or communication signals from the compensation module 24 and/or the at least one addition module 26 and may send data or communication signals to the autopilot system 14 of the aircraft, or to any other apparatus or system as required for a given application. For instance, the signals sent from the outputs 20 may comprise a signal representing a compensated pitch and a signal representing a compensated roll.

The compensation module 24 and the addition module 26 may comprise any number or combination of processors, controllers, integrated circuits, programmable logic devices, or other data and signal processing devices for carrying out the functions of the various modules and filters described herein. The compensation module 24 may comprise separate and distinct physical components to separately solve for pitch compensation and roll compensation, or may perform filtering and calculations described herein on shared physical components. The compensation module 24 may be configured for multiplying the pitch rate by a gain value and/or multiplying the roll rate by the gain value.

The pitch rate and the roll rate may each be multiplied by the gain value to obtain a compensating change in pitch and/or roll. For example, a pitch compensation amount may be the product of the pitch rate and the gain value, and a roll compensation amount may be the product of the roll rate and the gain value.

In various embodiments of the invention, the gain value may be variable and may be determined as a function of other values. For example, the gain value may be a variable of an autopilot mode of operation, airspeed, altitude, aircraft configuration (e.g. flap positions, gear position, etc), or any combination thereof. Additionally, the gain value may be changed from one installation to another installation and/or may be chosen by an operator of the apparatus 10. In various embodiments of the invention, a first gain value may be used for pitch compensation and a second gain value may be used for roll compensation. In some embodiments, the gain value may be a static value.

The gain value may represent a maximum time delay of the flight instrumentation system 12 or a duration of time less than the maximum time delay. For example, the gain value may be equal to or below an average value of total time delay, so that a reasonable amount of reduction in time delay may be achieved while avoiding overcompensation due to disturbances in the signal, such as those caused by turbulence and system noise.

The compensation module 24 may comprise one or more gain modules 42,44, one or more filters 46,48, and one or more saturation modules 50,52. In one embodiment of the compensation module 24, a rate compensation portion 28 of the compensation module 24 may comprise a rate gain module 42, a low-pass filter 46, and a first saturation module 50, while an acceleration compensation portion 30 of the compensation module 24 may comprise an acceleration gain module 44, a lead/lag filter 48, and a second saturation module 52. Various embodiments of the invention may include only the rate compensation portion 28 and omit the acceleration compensation portion 30. Further, the compensation module 24 may also construct higher-order kinematic terms such as angular jerk (i.e. time rate of change of angular acceleration) and high-order derivatives of angular motion through various additional module portions. Each module portion may include a filter of varying order, a gain module, and a saturation module as discussed above regarding the rate compensation portion 28 and acceleration compensation portion 30. The output of each of the N compensation module 24 portions (each representing a possible angular compensation amount) may be aggregated by the addition module 26 as discussed below. The filtering techniques and gain value employed by each compensation module 24 portion may also vary between portions depending on the kinematic term being constructed.

Thus, the compensation module 24 may include the rate compensation portion 28, the acceleration compensation portion 30, and any other portions corresponding to higher-order terms (e.g., jerk). The rate gain module 42 corresponding to the rate compensation portion 28 may receive signals from the low-pass filter 46, and then output signals to the saturation module 50. The acceleration gain module 44 corresponding to the acceleration compensation portion 30 may receive signals from lead/lag filter 48, and then output signals to the saturation module 52.

The acceleration compensation portion 30 may employ a different gain value than the rate compensation portion 28. For example, the gain value for the rate compensation portion 28 may be given by T while the gain value for the acceleration compensation portion 30 may be given by $\tau^2/2$ or another static or dynamic value. The outputs of each of the portions 28,30, and any other higher-order portions, may be summed together by the addition module 26 with at least one of the pitch and roll to provide compensation to the pitch and/or roll.

The rate gain module 42 may be configured for multiplying the gain value with signals representing at least one of the pitch rate and the roll rate, resulting in at least one of the pitch compensation amount and the roll compensation amount (or signals representing these amounts). Signals representing the pitch rate and/or the roll rate may first be filtered by low-pass filter 46, as described below, before being received by the rate gain module 42. The acceleration gain module 44, as described above, may multiply the output of the lead/lag filter 48, which may represent the pitch acceleration or the roll acceleration, by the gain value.

The filters 46,48 may be any filters known in the art. For example, the low-pass filter 46 may be suitable for filtering out high frequency components of the signal representing the pitch rate and/or the signal representing the roll rate while the lead/lag filter 48 is operable to derive the low-pass filtered angular acceleration from the pitch rate and/or roll rate.

The low-pass filter 46 may be a second-order low-pass filter, having a sample time Ts, a time constant Tc and a damping ratio zeta. The low-pass filter 46 may be digital low-pass filter implementation representative of a discrete equivalent of the following continuous domain transfer function:

$$Y(s) = \left(\frac{\omega_n^2}{s^2 + 2\zeta\omega_n s + \omega_n^2}\right) * X(s)$$

where $\zeta$ is the damping ratio, $\omega_n$ is equal to $$\frac{2\zeta}{T_n};$$

and $T_n$ is a representative time constant of the filter. The discrete time implementation of the low-pass filter may therefore be given by:

$$y(k) = b_0 x(k) + b_1 x(k-1) + b_2 x(k-2) - a_1 y(k-1) - a_2 y(k-2)$$

The lead/lag filter 48 (i.e., lead/lag compensator) may be a second-order lead/lag filter representative of discrete equivalents of the following continuous domain transfer function:

$$Y(s) = \left( \frac{s\omega_n^2}{s^2 + 2\zeta\omega_n s + \omega_n^2} \right) * X(s)$$

The discrete time implementation of the lead/lag filter 48 may therefore be given by:

$$y(k) = b_0 x(k) + b_1 x(k-1) + b_2 x(k-2) - a_1 y(k-1) - a_2 y(k-2)$$

The filters 46,48 may receive the signals from the input 18, filter or modify various frequency components, and then send the signals to at least one of the gain modules 42,44. However, the filters 46,48 may be implemented at any point within the apparatus 10 for filtering any of the signals therein without departing from the scope of the invention.

The saturation modules 50,52 may be configured to saturate signals representing the pitch compensation amount, the roll compensation amount, or any output of the gain modules 42,44 at certain maximum and minimum levels. The signals sent through the filters 46,48 and/or the gain modules 42,44 may be relatively large due to turbulent conditions. Therefore, if the maximum rate of change of pitch and roll are known, these values may be used by the saturation modules 50,52 to determine by how much to saturate the output of one or both of the gain modules 42,44.

The addition module 26 may comprise a pitch addition module and/or a roll addition module. The pitch addition module may be configured to add the pitch compensation amount to the pitch of the aircraft, and the roll addition module may be configured to add the roll compensation amount to the roll of the aircraft. The addition module 26 may be communicably coupled with the compensation module 24 and/or may be implemented integrally on the same device as the compensation module 24, such that the compensation module 24 may further comprise the addition module 26. The addition module 26 may aggregate any combination of signals provided by the compensation module 24. For example, where the compensation module 24 provides N output signals corresponding to Nth-order terms, the addition module 26 may aggregate any combination of the N output signals and may additionally aggregate input 16.

Figure 5:
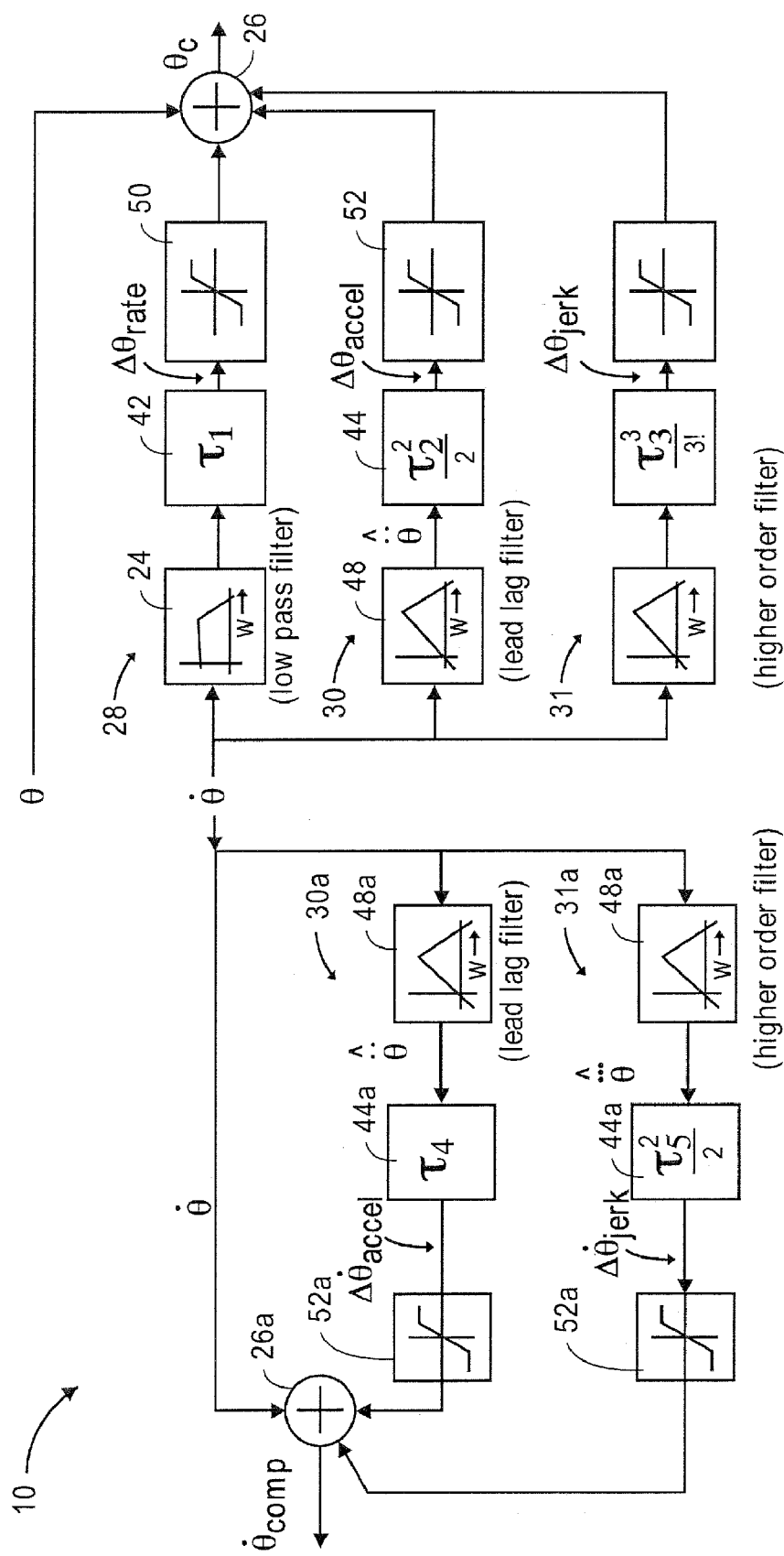
FIG. 5 is a schematic view of an apparatus constructed in accordance with various other embodiments of the present invention.

Referring now to FIG. 5, another exemplary embodiment of the apparatus 10 is illustrated. The apparatus 10 of FIG. 5 includes the rate compensation portion 28, the acceleration compensation portion 30, and the jerk compensation portion 31 discussed above for compensating pitch, roll, yaw, and/or heading (θ of FIG. 5). In addition to, or as an alternative to, compensating θ, the apparatus 10 of FIG. 5 may be configured to determine compensated angular rates (θ̇ of FIG. 5), such as an angular rate measurement output by an AHRS. The various angular rates that may be compensated by the apparatus 10 include, for example, pitch rate, roll rate, heading rate, yaw rate, the x, y, z, body rate components (p, q, r) of the angular velocity vector of the aircraft body relative to an inertial reference frame, combinations thereof, and the like. The angular velocity vector, ω, of the aircraft body (B) relative to an inertial reference frame (N) can be expressed as:

$$\omega = p\vec{x} + q\vec{y} + r\vec{z}.$$

The body rates (p, q, r) are related to the inertial rates ($\dot{\phi}$, $\dot{\theta}$, $\dot{\varphi}$) by the following equation:

$$\begin{bmatrix} \dot{\phi} \\ \dot{\theta} \\ \dot{\varphi} \end{bmatrix} = \begin{bmatrix} 1 & \tan(\theta)\sin(\phi) & \tan(\theta)\cos(\phi) \\ 0 & \cos(\phi) & -\sin(\phi) \\ 0 & \sin(\phi)/\cos(\theta) & \cos(\phi)/\cos(\theta) \end{bmatrix} \begin{bmatrix} p \\ q \\ r \end{bmatrix}$$

where φ, θ, ϕ are roll, pitch, and yaw angles. Therefore, if either body rates or inertial rates are known, the apparatus 10 can derive their counterparts by using the related roll, pitch, and yaw angles.

To provide a compensated angular rate, the apparatus 10 may include acceleration compensation portion 30a, jerk compensation portion 31a, and/or additional higher-order portions. Compensation portions 30a, 31a may each be configured to include one or more filters 48a (e.g., lead-lag filters), gain modules 44a, and saturation modules 52a each configured substantially as described above. As is also discussed above, the various gains employed by each of the gain modules 42, 44, 44a, may by unique and variable. The output of the portions 30a, 31a, and any other higher-order portions, along with the angular rate to be compensated, may be aggregated by an addition module 26a to generate the compensated angular rate for use by the autopilot system 14 or other aircraft system.

Figure 3:
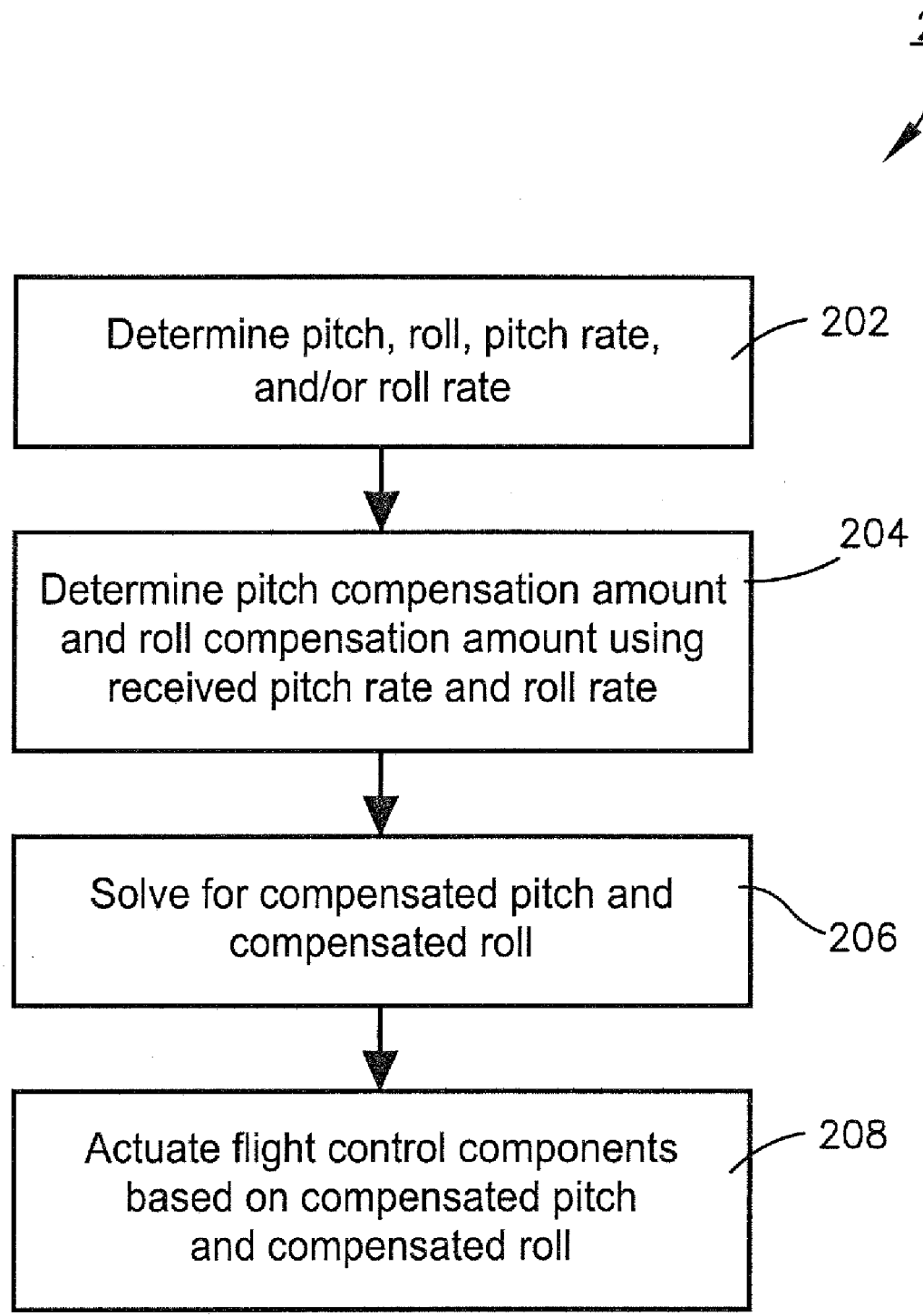
FIG. 3 is a flow chart depicting an embodiment of a method for predicting pitch and roll of the aircraft using the apparatus of FIG. 1.

In use, the apparatus 10 or a similar apparatus may perform a method 200 of predicting or estimating future values for pitch and roll angles to compensate for a time delay introduced by the flight instrumentation system 12. The method 200, illustrated in FIG. 3, may comprise the steps of determining the pitch, the roll, the pitch rate, and/or the roll rate of the aircraft, as depicted in step 202. For example, these pitch and roll values may be determined by the flight instrumentation system 12.

The method may further comprise determining the pitch compensation amount and determining the roll compensation amount, as depicted in step 204. The pitch compensation amount may be determined by multiplying the pitch rate by the gain value and the roll compensation amount may be determined by multiplying the roll rate by the gain value. For example, signals representing the pitch rate and the roll rate may be filtered by the filters 46,48. The resulting filtered signals may then each pass through at least one of the gain modules 42,44 to be multiplied by a gain value representing an amount of delay for which to compensate. The output of the gain modules 42,44 may be signals representing the pitch compensation amount and/or the roll compensation amount. The output from the gain modules 42,44 may also be input into the saturation modules 50,52 to saturate the signals at certain maximum and minimum levels.

As described above, the gain value of the gain modules 42,44 may correspond to the amount of time to compensate. The amount of compensation may reflect an expected change in pitch and roll for the maximum time delay or for some duration less than the maximum time delay. Compensating for the maximum time delay may result in over-compensation. Turbulence and noise introduced by the aircraft or the apparatus 10 may further contribute to over-compensation, which is undesirable. Therefore, setting the gain modules 42,44 to compensate for an amount of time below an average value of total time delay may allow a reasonable amount of reduction in time delay while avoiding overcompensation due to disturbances like turbulence.

To determine an average value of total time delay, the flight instrumentation system 12 may be tested. Then the gain values used by the gain modules 42,44 may be chosen based on the average value of total time delay as well as the autopilot system 14 requirements and/or the amount of delay that the autopilot system 14 tolerates or expects.

As depicted in step 206, the compensated pitch may be determined by adding the pitch compensation amount to the pitch of the aircraft and the compensated roll may be determined by adding the roll compensation amount to the roll of the aircraft. For example, the signals representing the pitch compensation amount and the roll compensation amount may be input into the addition module 26 after being output by the saturation modules 50,52. A plurality of pitch compensation amounts and/or roll compensation amounts may be produced by the compensation module 24 and added together. As described above, the pitch rate and/or the roll rate may be passed through various filters and multiplied by various gain values, with the resulting outputs being added together by the addition module 26. For example, the compensation module 24 may multiply the output of the lead/lag filter 48 by the gain value to determine a first product and may multiply the output of the low-pass filter 46 by the gain value to determine a second product. Then the addition module 26 may add the first product to the second product and to the pitch and/or the roll of the aircraft to determine the compensated pitch and/or the compensated roll.

As depicted in step 208, the method 200 may further comprise actuating any of a plurality of flight control components (not shown) based on the compensated pitch and/or the compensated roll. For example, signals representing the compensated pitch and the compensated roll may be output by the addition module 26 and input into the autopilot system 14 to determine what control and actuation signals must be sent to the flight control components 15 in order to keep the aircraft flying within pre-set flight limits.

Figure 4:
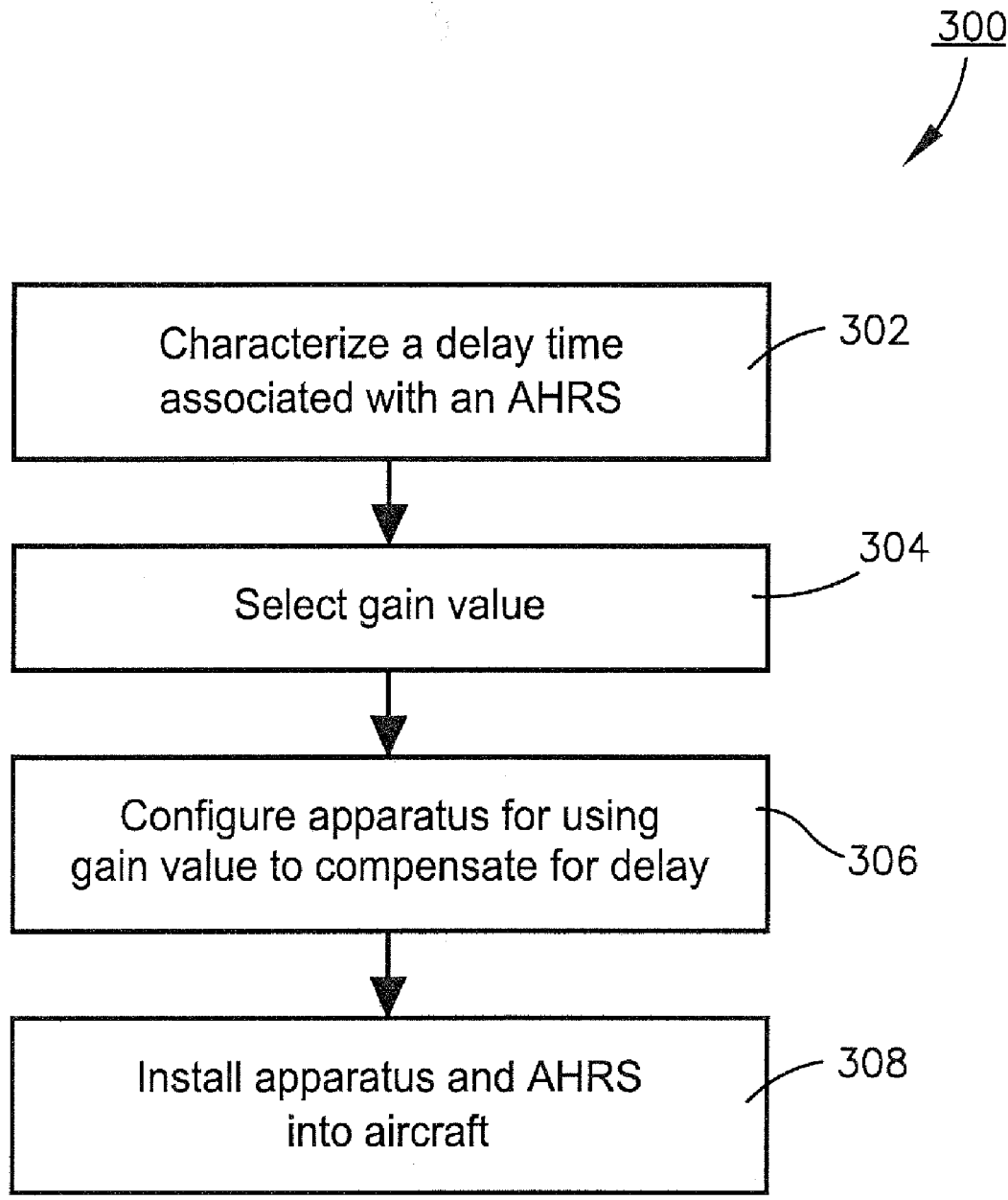
FIG. 4 is a flow chart depicting an embodiment of a method for retrofitting an aircraft with an AHRS according to an embodiment of the invention.

In another embodiment of the invention illustrated in FIG. 4, a method 300 for retrofitting an aircraft with an AHRS is provided. The method 300 may comprise characterizing delay time properties associated with or introduced by an AHRS, as depicted in step 302. Additionally, the delay time properties may also account for delays associated with implementing the compensation (e.g. computation delay) and outputting the compensated pitch or roll (e.g. digital-to-analog (D/A) conversion delay). As discussed above, testing may be conducted to determine a maximum delay time, a minimum delay time, an average delay time, etc.

The method 300 may also comprise selecting the gain value to correspond to the delay time, as depicted in step 304, and configuring the apparatus 10 for using the gain value to determine the compensated pitch and/or the compensated roll of the aircraft, as depicted in step 306. Configuring the apparatus 10 may, for example, comprise configuring the compensation module 24 to multiply the gain value with the pitch rate and/or the roll rate and configuring the addition module 26 to output the compensated pitch and/or the compensated roll by adding at least one output of the compensation module 24 and the pitch and/or the roll of the aircraft.

Finally, method 300 may comprise installing the AHRS and the apparatus 10 in the aircraft, as depicted in step 308. For example, installing the AHRS and the apparatus 10 in the aircraft may include attaching at least one input of the apparatus 10 to the AHRS and attaching at least one output of the apparatus 10 to the autopilot system 14.

Although the invention has been described with reference to the embodiments illustrated in the attached drawing figures, it is noted that equivalents may be employed and substitutions made herein without departing from the scope of the invention as recited in the claims. For example, the apparatus 10 may be implemented on components independent from the flight instrumentation system 12 and the autopilot system 14. However, alternatively, the apparatus 10 may be integrated with or implemented on components of the flight instrumentation system 12, the autopilot system 14, or both. Further, in some embodiments, the apparatus 10 may be used to compensate signals other than pitch and roll rate. For example, the apparatus 10 may be configured to compensate heading and yaw in addition to, or as an alternative to, the pitch and roll compensation discussed above.

Having thus described various embodiments of the invention, what is claimed as new and desired to be protected by Letters Patent includes the following:

The invention claimed is:

1. An apparatus for predicting at least one of pitch and roll of an aircraft, the apparatus comprising:
    a first input configured to receive a signal representing at least one of pitch and roll of an aircraft;
    a second input configured to receive a signal representing at least one of pitch rate and roll rate of an aircraft;
    a compensation module configured to compute at least one of a compensated pitch and a compensated roll based on at least one of the pitch, roll, pitch rate, and roll rate; and
    a first output configured to output a signal representing at least one of the compensated pitch and the compensated roll.

2. The apparatus of claim 1, coupled to or further comprising an autopilot system configured to receive the signal from the first output and actuate any of a plurality of flight control components associated with the aircraft based on the signal output from the first output.

3. The apparatus of claim 1, coupled to or further comprising a flight instrumentation system configured to determine any of the pitch, roll, pitch rate, and roll rate of the aircraft, and communicably coupled with at least one of the first input and the second input.

4. The apparatus of claim 3, wherein the flight instrumentation system is at least one of an AHRS and an ADC.

5. The apparatus of claim 1, wherein the compensation module is configured to filter and then multiply at least one of the pitch rate and the roll rate by a gain value to determine at least one of a roll compensation amount and a pitch compensation amount and then add the at least one of the pitch and the roll of the aircraft to at least one of the pitch compensation amount and the roll compensation amount to determine at least one of the compensated pitch and the compensated roll.

6. The apparatus of claim 5, wherein the gain value corresponds to a value equal to or below an average amount of net time delay associated with a flight instrumentation system to determine at least one of the pitch, roll, pitch rate, and roll rate of the aircraft.

7. The apparatus of claim 5, wherein compensation module further comprises at least one of a low-pass filter and a lead/lag filter configured to filter the at least one of the pitch rate and the roll rate.

8. The apparatus of claim 7, wherein the compensation module includes both the low-pass filter and lead/lag filter and the compensation module is further configured to multiply the output of the lead/lag filter by a first gain value to determine a first product and to multiply the output of the low-pass filter by a second gain value to determine a second product, and then add the first product to the second product and to at least one of the pitch and the roll of the aircraft to determine at least one of the compensated pitch and the compensated roll.

9. The apparatus of claim 8, wherein the compensation module includes a plurality of lead/lag filters of varying order and the compensation module is operable to multiply the output of each of the lead/lag filters by one or more gain values to determine a plurality of products for addition to the first product and at least one of the pitch and the roll of the aircraft to determine at least one of the compensated pitch and the compensated roll.

10. The apparatus of claim 1, wherein the compensation module is further operable to compute a compensated heading based on a heading and a heading rate.

11. An apparatus for predicting at least one of pitch and roll of an aircraft, the system comprising:
   a first input configured for receiving a signal representing at least one of pitch and roll of an aircraft;
   a second input configured for receiving a signal representing at least one of pitch rate and roll rate of an aircraft;
   a compensation module configured to compute at least one of a compensated pitch and a compensated roll by multiplying at least one of the pitch rate and the roll rate by a gain value to determine at least one of a pitch compensation amount and a roll compensation amount and then adding the at least one of the pitch and the roll of the aircraft to at least one of the pitch compensation amount and the roll compensation amount; and
   a first output configured for outputting a signal representing at least one of the compensated pitch and the compensated roll to an autopilot system.

12. The apparatus of claim 11, further comprising the autopilot system configured to receive the signal from the first output and actuate any of a plurality of flight control components associated with the aircraft based on the signal output from the first output.

13. The apparatus of claim 11, wherein the first input comprises:
   a pitch input configured for receiving a signal representing the pitch of the aircraft; and
   a roll input configured for receiving a signal representing the roll of the aircraft.

14. The apparatus of claim 11, wherein the second input comprises:
   a pitch rate input configured for receiving a signal representing the pitch rate of the aircraft; and
   a roll rate input configured for receiving a signal representing the roll rate of the aircraft.

15. The apparatus of claim 11, wherein the first output comprises:
   a compensated pitch output for outputting a signal representing the compensated pitch; and
   a compensated roll output configured for outputting a signal representing the compensated roll.

16. The apparatus of claim 12, wherein the flight system is an autopilot system configured to receive signals from the first output as part of a control loop to determine how to actuate the flight control components of the aircraft.

17. The apparatus of claim 11, wherein the compensation module further comprises a low-pass filter configured to filter out high frequency components of the signal representing at least one of the pitch rate and the roll rate of an aircraft.

18. The apparatus of claim 11, wherein the compensation module further comprises at least one saturation module configured to limit signals representing at least one of the pitch compensation amount and the roll compensation amount to be within predefined upper and lower bounds.

19. The apparatus of claim 11, wherein the gain value corresponds with an amount of delay time below a maximum amount of delay time expected from a flight instrumentation system configured to provide signals to the first and second inputs of the apparatus.

20. The apparatus of claim 11, further comprising a flight instrumentation system configured to determine at least one of the pitch, roll, pitch rate, and roll rate of the aircraft, and configured to transmit at least one signal representing at least one of the pitch, roll, pitch rate, and roll rate of the aircraft to at least one of the first input and the second input, wherein the flight instrumentation system is at least one of an attitude and reference heading system (AHRS) and an air data computer (ADC).

21. The apparatus of claim 11, wherein the compensation module further comprises a low-pass filter and a lead/lag filter configured to filter at least one of the pitch rate and the roll rate, wherein the compensation module is further configured to multiply the output of the lead/lag filter by a first gain value to determine a first product and to multiply the output of the low-pass filter by a second gain value to determine a second product, and then add the first product to the second product and to at least one of the pitch and the roll of the aircraft to determine at least one of the compensated pitch and the compensated roll.

22. The apparatus of claim 21, wherein the compensation module includes a plurality of lead/lag filters of varying order and the compensation module is operable to multiply the output of each of the lead/lag filters by one or more gain values to determine a plurality of products for addition to the first product and at least one of the pitch and the roll of the aircraft to determine at least one of the compensated pitch and the compensated roll.

23. A method for retrofitting an aircraft with an attitude and reference heading system (AHRS), the method comprising:
   characterizing a delay time associated with the AHRS;
   selecting a gain value corresponding to the delay time;
   configuring an apparatus for using the gain value to determine at least one of a compensated pitch and a compensated roll of the aircraft; and
   installing the AHRS and the apparatus in the aircraft.

24. The method of claim 23, further comprising:
   configuring a compensation module of the apparatus to multiply the gain value with at least one of a pitch rate and a roll rate of the aircraft; and
   configuring at least one addition module to output at least one of the compensated pitch and the compensated roll, wherein the compensated pitch and the compensated roll are determined by adding an output of the gain module and at least one of a pitch and a roll of the aircraft.

25. The method of claim 23, wherein installing the AHRS and the apparatus in the aircraft further comprises attaching at least one input of the apparatus to the AHRS and attaching at least one output of the apparatus to an autopilot system.

* * * * *